(12) United States Patent
Sato et al.

(10) Patent No.: US 11,637,312 B2
(45) Date of Patent: Apr. 25, 2023

(54) SULFIDE SOLID ELECTROLYTE

(71) Applicant: IDEMITSU KOSAN CO., LTD., Chiyoda-ku (JP)

(72) Inventors: Atsushi Sato, Sodegaura (JP); Kota Terai, Sodegaura (JP); Futoshi Utsuno, Sodegaura (JP)

(73) Assignee: IDEMITSU KOSAN CO., LTD., Chiyoda-ku (JP)

( * ) Notice: Subject to any disclaimer, the term of this patent is extended or adjusted under 35 U.S.C. 154(b) by 506 days.

(21) Appl. No.: 16/626,165

(22) PCT Filed: Jun. 18, 2018

(86) PCT No.: PCT/JP2018/023142
§ 371 (c)(1),
(2) Date: Dec. 23, 2019

(87) PCT Pub. No.: WO2019/003986
PCT Pub. Date: Jan. 3, 2019

(65) Prior Publication Data
US 2020/0220207 A1    Jul. 9, 2020

(30) Foreign Application Priority Data

Jun. 29, 2017 (JP) .............................. JP2017-127152

(51) Int. Cl.
*H01M 10/0562* (2010.01)
*H01M 4/62* (2006.01)
*H01M 10/0525* (2010.01)

(52) U.S. Cl.
CPC ......... *H01M 10/0562* (2013.01); *H01M 4/62* (2013.01); *H01M 10/0525* (2013.01)

(58) Field of Classification Search
CPC . H01M 10/0562; H01M 10/0525; H01M 4/62
See application file for complete search history.

(56) References Cited

U.S. PATENT DOCUMENTS

| 2010/0290969 A1 | 11/2010 | Deiseroth et al. |
| 2013/0040208 A1 | 2/2013 | Kanno et al. |
| 2014/0141341 A1 | 5/2014 | Ohtomo et al. |

(Continued)

FOREIGN PATENT DOCUMENTS

| JP | 2010-540396 A | 12/2010 |
| JP | 2013-16423 A | 1/2013 |

(Continued)

OTHER PUBLICATIONS

Bachman, et al., "Inorganic Solid-State Electrolytes for Lithium Batteries: Mechanisms and Properties Governing Ion Conduction." American Chemical Society, Chemical Reviews 116, No. 1 pp. 140-162 (Year: 2016).*

(Continued)

*Primary Examiner* — Jayne L Mershon
(74) *Attorney, Agent, or Firm* — Oblon, McClelland, Maier & Neustadt, L.L.P.

(57) ABSTRACT

A sulfide solid electrolyte containing the following (A) and (B):
(A) a sulfide solid electrolyte having an argyrodite-type crystal structure; and
(B) a sulfide solid electrolyte having a crystal structure different from the argyrodite-type crystal structure of the above-mentioned (A).

21 Claims, 4 Drawing Sheets

(56) References Cited

U.S. PATENT DOCUMENTS

| | | |
|---|---|---|
| 2014/0302382 A1 | 10/2014 | Kambara et al. |
| 2015/0357675 A1 | 12/2015 | Ohtomo et al. |
| 2016/0133989 A1 | 5/2016 | Suzuki et al. |
| 2016/0149259 A1 | 5/2016 | Osada et al. |
| 2016/0156064 A1 | 6/2016 | Miyashita et al. |
| 2016/0359194 A1* | 12/2016 | Meguro ............ H01M 10/0585 |
| 2017/0194662 A1 | 7/2017 | Kambara et al. |
| 2017/0222257 A1 | 8/2017 | Miyashita et al. |
| 2017/0346075 A1 | 11/2017 | Mimura et al. |
| 2017/0352916 A1 | 12/2017 | Miyashita et al. |
| 2018/0170756 A1* | 6/2018 | Sato ........................ H01M 6/18 |
| 2018/0233775 A1 | 8/2018 | Suzuki et al. |

FOREIGN PATENT DOCUMENTS

| | | |
|---|---|---|
| JP | 2013-157084 A | 8/2013 |
| JP | 2015-11898 A | 1/2015 |
| JP | 2015-11901 A | 1/2015 |
| JP | 2015-153466 A | 8/2015 |
| JP | 2015-173100 A | 10/2015 |
| JP | 2016-24874 A | 2/2016 |
| JP | 2016-157630 A | 9/2016 |
| WO | WO 2011/118801 A1 | 9/2011 |
| WO | WO 2013/069243 A1 | 5/2013 |
| WO | WO 2015/011937 A1 | 1/2015 |
| WO | WO 2015/012042 A1 | 1/2015 |
| WO | WO 2016/104702 A1 | 6/2016 |
| WO | WO 2016/132872 A1 | 8/2016 |
| WO | WO 2016/204255 A1 | 12/2016 |
| WO | WO 2018/003333 A1 | 1/2018 |

OTHER PUBLICATIONS

English translation of the International Search Report dated Sep. 11, 2018 in PCT/JP2018/023142, 2 pages.

English translation of the International Preliminary Report on Patentability and Written Opinion of the International Searching Authority dated Jan. 9, 2020 in PCT/JP2018/023142 filed Jun. 18, 2018, 9 pages.

Japanese Office Action dated Jun. 7, 2022 in Japanese Patent Application No. 2019-526814 (with unedited computer generated English translation), 7 pages.

* cited by examiner

SULFIDE SOLID ELECTROLYTE

TECHNICAL FIELD

The invention relates to a sulfide solid electrolyte.

BACKGROUND ART

With rapid spread of information-related equipment or communications equipment such as personal computers, video cameras, and mobile phones in recent years, development of batteries used as a power source thereof has been considered to be important. Among these batteries, a lithium ion battery has attracted attention from a viewpoint of high energy density.

In the lithium ion battery that is currently commercially available, a liquid electrolyte containing a flammable organic solvent is used, and therefore, attachment of a safety device that suppresses an increase in temperature at the time of short circuit, or improvement in structural and material aspects for preventing short circuit is required. On the other hand, in the lithium ion battery formed into all-solid-state battery by using a solid electrolyte in place of the liquid electrolyte, it is considered that the flammable organic solvent is not used in the battery, and therefore, the safety device can be simplified, and the lithium ion battery is excellent in a production cost or productivity.

A sulfide solid electrolyte is known as a solid electrolyte used in a lithium ion battery. Various crystal structures of sulfide solid electrolytes are known (for example, see Patent Documents 1 to 5). Among them, a sulfide solid electrolyte having an argyrodite-type crystal structure (hereinafter, referred to as an argyrodite-type solid electrolyte) has a stable crystal structure, and a sulfide solid electrolyte having high ionic conductivity has also been developed (for example, see Patent Documents 6 to 9).

RELATED ART DOCUMENTS

Patent Documents

[Patent Document 1] JP 2013-16423 A
[Patent Document 2] WO 2013/069243
[Patent Document 3] JP 2015-11898 A
[Patent Document 4] JP 2015-11901 A
[Patent Document 5] WO 2011/118801
[Patent Document 6] WO 20151011937
[Patent Document 7] WO 2015/012042
[Patent Document 8] JP 2016-24874 A
[Patent Document 9] WO 2016/104702

SUMMARY OF THE INVENTION

Although the ionic conductivity of the argyrodite-type solid electrolyte was high, there was a problem that the compaction property was poor. When the compaction property is poor, the battery performance may deteriorate, such as a decrease in the capacity retention rate of the lithium ion battery.

An object of the present invention is to provide a sulfide solid electrolyte which exhibits excellent battery performance with good compaction property by using an argyrodite-type solid electrolyte.

As a result of intensive studies to solve the above-mentioned problems, the present inventors have found that the compaction property is improved by mixing a sulfide solid electrolyte having an argyrodite-type solid electrolyte with a sulfide solid electrolyte having another crystal structure, thereby completing the present invention.

According to an embodiment of the present invention, a sulfide solid electrolyte comprising the following (A) and (B) can be provided.

(A) a sulfide solid electrolyte having an argyrodite-type crystal structure (B) a sulfide solid electrolyte having a crystal structure different from the argyrodite-type crystal structure of the above-mentioned (A)

According to an embodiment of the present invention, a sulfide solid electrolyte having good compaction property can be provided by using an argyrodite-type solid electrolyte. By improving the compaction property, it is possible to suppress a decrease in the capacity retention rate in the lithium ion battery of the present invention.

MODE FOR CARRYING OUT THE INVENTION

A sulfide solid electrolyte according to an embodiment of the present invention is characterized in comprising a sulfide solid electrolyte (A) having an argyrodite-type crystal structure and a sulfide solid electrolyte (B) having a crystal structure different from the above-mentioned (A). As a result, a sulfide solid electrolyte having a good compaction property can be obtained by using an argyrodite-type solid electrolyte.

For example, in the case of producing a laminated lithium ion battery, there is a step of forming a three-layer laminate of a positive electrode material, a solid electrolyte, and a negative electrode material on a substrate by a dry method or a wet method, and then applying pressure with a press machine. In this process, each material is compacted, but when the pressure is released, a space is generated due to the elastic force of each material (elastic recovery) and the apparent density is reduced. The space generated by the elastic recovery causes the conductivity of the lithium ion to be lowered. In the case where the generation rate of the space due to the elastic recovery is small, that is, in the case where the compaction property is good, the conduction of lithium ion is not hindered, and thus the final battery performance is improved.

The fact that the sulfide solid electrolyte (A) contains an argyrodite-type crystal structure can be confirmed by having diffraction peaks at 2θ=25.2±0.5 deg and 29.7±0.5 deg in powder X-ray diffraction measurement using CuKα rays.

Diffraction peaks of 2θ=25.2±0.5 deg and 29.7±0.5 deg are peaks derived from argyrodite-type crystal structures. The argyrodite-type crystal structure is a structure in which $PS_4^{3-}$ is as a unit structure of a main skeleton, and a sulfur element (S) or a halogen element (X) surrounded by a lithium element (Li) is arranged around the unit structure.

Diffraction peaks of the argyrodite crystal structure may also appear, for example, at 2θ=15.3±0.5 deg, 17.7±0.5 deg, 31.1±0.5 deg, 44.9±0.5 deg, and 47.7±0.5 deg. The sulfide solid electrolyte (A) may have these peaks.

In the present application, the position of the diffraction peak is determined by A±0.5 deg or A±0.4 deg when the median value is A, but A±0.3 deg is preferred. For example, in the case of the above-mentioned diffraction peak of 2θ=25.2±0.5 deg, the median value A is 25.2 deg, and it is preferable that the diffraction peak is present in the range of 2θ=25.2±0.3 deg. The same can be applied to determination of all of the other diffraction peak positions in the invention.

Examples of the argyrodite-type crystal structure include crystal structures disclosed in Patent Documents 6 to 9, JP 2010-540396 A, JP 2011-096630 A, and JP 2013-211171 A. Examples of the compositional formulae include, for example, $Li_6PS_5X$, $Li_{7-x}PS_{6-x}$ (X=Cl, Br, I; x=0.0 to 1.8).

In the present embodiment, the sulfide solid electrolyte (A) preferably contains lithium, sulfur, phosphorus, and halogen as constituent elements. Examples of the halogen include F, Cl, Br, and I. In the present embodiment, the halogen is preferably Cl or Br, and is preferably Cl and Br.

Examples of the crystal structure of the sulfide solid electrolyte (B) include, for example, a $Li_3PS_4$ crystal structure, a $Li_4P_2S_8$ crystal structure, a $Li_7P_3S_{11}$ crystal structure, a $Li_{4-x}Ge_{1-x}P_xS_4$ thio-LISICON Region II-type crystal structure, and a crystal structure similar to the $Li_{4-x}Ge_{1-x}P_xS_4$ thio-LISICON Region II-type crystal structure (hereinafter, abbreviated as a RII-type crystal structure) may be used.

In the present embodiment, the sulfide solid electrolyte (B) preferably has a RII-type crystal structure. The fact that the sulfide solid electrolyte (B) has the RII-type crystal structure can be confirmed by having a peak at 2θ=20.2±0.5 deg and 23.6±0.5 deg in X-ray diffraction measurement using CuKα rays. Note that the crystal phase specified by these peaks may be referred to as a high Li-ion conduction phase. In addition to 2θ=20.2±0.5 deg and 23.6±0.5 deg, the high L-ion conduction phase may have peaks at 2θ=29.4±0.5 deg, 37.8±0.5 deg, 41.1±0.5 deg and 47.0±0.5 deg. It is preferable that the sulfide solid electrolyte (B) have only a peak of a high Li-ion conduction phase, that is, have a high Li-ion conducting phase as a single phase.

In the present embodiment, the sulfide solid electrolyte (B) preferably contains lithium, sulfur, phosphorus, and halogen as constituent elements. Examples of the halogen include F, Cl, Br, and I. In the present embodiment, the sulfide solid electrolyte (B) preferably contains at least Br as a halogen.

The mass ratio of the sulfide solid electrolyte (A) and the sulfide solid electrolyte (B) [(A):(B)] is preferably 5:95 to 95:5, more preferably 30:70 to 90:10, more preferably 40:60 to 80:20, and particularly preferably 50:50 to 70:30. In the above range, the effect of improving the compaction property is high while having high ionic conductivity.

The shapes of the sulfide solid electrolyte (A) and the sulfide solid electrolyte (B) are not particularly limited, but are usually particulate. For example, the volume-based mean particle diameter ($D_{50}$) of the respective sulfide solid electrolyte is more preferably 50 μm or less, and particularly preferably 10 μm or less.

The volume-based mean particle diameter is measured by laser diffraction particle size distribution measurement. The lower limit of the volume-based mean particle diameter is generally about 0.1 μm.

The sulfide solid electrolyte according to an embodiment of the present invention may include a sulfide solid electrolyte (A) having an argyrodite-type crystal structure, a sulfide solid electrolyte (B) having a crystal structure different from the above-mentioned (A), and other crystal structures or amorphous structures. Examples of the other crystal structures include a crystal structure derived from a raw material and a crystal structure of a sulfide solid electrolyte other than the above-mentioned (A) and (B). Examples of the amorphous structures include sulfide glass. These crystal structures and amorphous structures can be confirmed by an X-ray diffraction pattern obtained by X-ray diffraction measurement. In the sulfide solid electrolyte of the present embodiment, it is preferable that an argyrodite-type crystal structure of the above-mentioned (A) and a crystal structure different from the argyrodite crystal structure of the above-mentioned (B) be the main component, that is, the maximum peak of the crystal structure of the sulfide solid electrolyte of the above-mentioned (A) and (B) which appears in the X-ray diffraction pattern obtained by X-ray diffraction measurement is larger than the maximum peak of the other crystal structure and amorphous structure. It is more preferable that the sulfide solid electrolyte of the present embodiment be composed of only an argyrodite-type crystal structure of the above-mentioned (A) and a crystal structure different from the argyrodite type crystal structure of the above-mentioned (B).

The method for producing the sulfide solid electrolyte (A) and sulfide solid electrolyte (B) is not particularly limited. For example, reference can be made to Patent Documents 1 to 9. Hereinafter, as an example of a producing method, a producing method of an argyrodite-type solid electrolyte and a sulfide solid electrolyte having a RII-type crystal structure (hereinafter, referred to as a RII-type solid electrolyte) will be described.

As a starting material of the argyrodite-type solid electrolyte and the RII-type solid electrolyte, a compound or a simple substance containing an element which these solid electrolytes contain as essential elements, for example, lithium, phosphorus and sulfur, and optionally an element such as halogen, as a constituent element can be used.

Examples of the compound containing lithium include, for example, lithium sulfide ($Li_2S$), lithium oxide ($Li_2O$), and lithium carbonate ($Li_2CO_3$). Among these, lithium sulfide is preferable.

The lithium sulfide can be used without any particular limitation, but a lithium sulfide having a high purity is preferable. Lithium sulfide can be produced, for example, by the method described in JP H07-330312 A, JP H09-283156 A, JP 2010-163356 A, and JP 2011-84438 A.

Specifically, lithium hydroxide and hydrogen sulfide are reacted in a hydrocarbon-based organic solvent at 70° C. to 300° C. to form lithium hydrosulfide, and subsequently, hydrogen sulfide is removed from this reaction solution, thereby to produce lithium sulfide (JP 2010-163356 A).

Further, by reacting lithium hydroxide and hydrogen sulfide in an aqueous solvent at 10° C. to 100° C. to form lithium hydrosulfide, and subsequently, hydrogen sulfide is removed from this reaction solution, thereby to produce lithium sulfide (JP 2011-84438 A).

Examples of the compound containing phosphorus include phosphorus compounds such as phosphorus sulfide, for example, diphosphorus trisulfide ($P_2S$), diphosphorus pentasulfide ($P_2S_5$), and the like, and sodium phosphate ($Na_3PO_4$) and the like. Among them, phosphorus sulfide is preferable, and $P_2S_5$ is more preferable.

Examples of the compound containing halogen include, for example, a compound represented by the general formula ($M_l$-$X_m$).

In the formula, M represents sodium (Na), lithium (Li), boron (B), aluminum (Al), silicon (Si), phosphorus (P), sulfur (S), germanium (Ge), arsenic (As), selenium (Se), tin (Sn), antimony (Sb), tellurium (Te), lead (Pb), bismuth (Bi), or a compound to which an oxygen element or a sulfur element is bonded to these element, and Li or P is preferable, and Li is particularly preferable.

X is a halogen selected from the group consisting of F, Cl, Br, and I.

In addition, l is an integer of 1 or 2, and m is an integer of 1 to 10.

When m is an integer of 2 to 10, that is, when a plurality of Xs are present, Xs may be the same or different. For example, in the case of $SiBrCl_3$ mentioned later, m is 4, and Xs are different elements, i.e. Br and Cl.

Examples of the halogen compound represented by the above-mentioned formula include sodium halide such as NaI, NaF, and NaCl, NaBr; lithium halide such as LiF, LiCl, LiBr, and LiI; boron halide such as $BCl_3$, $BBr_3$, $BI_3$; aluminum halide such as $AlF_3$, $AlBr_3$, $AlI_3$, $AlCl_3$; silicon halide such as $SiF_4$, $SiCl_4$, $SiCl_3$, $Si_2Cl_5$, $SiBr_4$, $SiBrCl_3$, $SiBr_2Cl_2$, $SiI_4$; phosphorus halide such as $PF_3$, $PF_5$, $PCl_3$, $PCl_5$, $POCl_3$, $PBr_3$, $POBr_3$, $PI_3$, $P_2Cl_4$, $P_2I_4$; sulfur halide such as $SF_2$, $SF_4$, $SF_6$, $S_2F_{10}$, $SCl_2$, $S_2Cl_2$, $S_2Br_2$; germanium halide such as $GeF_4$, $GeCl_4$, $GeBr_4$, $GeI_4$, $GeF_2$, $GeCl_2$, $GeBr_2$, $GeI_2$; arsenic halide such as $AsF_3$, $AsCl_3$, $AsBr_3$, $AsI_3$, $AsF_5$; selenium halide such as $SeF_4$, $SeFe_6$, $SeCl_2$, $SeCl_4$, $Se_2Br_2$, $SeBr_4$; tin halide such as $SnF_4$, $SnCl_4$, $SnBr_4$, $SnI_4$, $SnF_2$, $SnCl_2$, $SnBr_2$, $SnI_2$; antimony halide such as $SbF_3$, $SbCl_3$, $SbBr_3$, $SbI_3$, $SbF_5$, $SbCl_5$; tellurium halide such as $TeF_4$, $Te_2F_{10}$, $TeF_6$, $TeCl_2$, $TeCl_4$, $TeBr_2$, $TeBr_4$, $TeI_4$; lead halide such as $PbF_4$, $PbCl_4$, $PbF_2$, $PbCl_2$, $PbBr_2$, $PbI_2$; bismuth halide such as $BiF_3$, $BiCl_3$, $BiBr_3$, $BiI_3$, and the like.

Among these, lithium halide or phosphorus halide is preferable, and LiCl, LiBr, LiI or $PBr_3$ is more preferable, LiCl, LiBr or LiI is still more preferable, and LiCl or LiBr is particularly preferable. One of the kinds of above-mentioned halogen compounds may be used alone, or a combination of two or more kinds may be used.

Examples of the simple substance constituting the raw material mixture include a lithium metallic simple substance, a phosphorus simple substance such as red phosphorus, or a sulfur simple substance.

The above-mentioned compound and the simple substance can be used without any particular limitation as long as they are industrially manufactured and sold. It is preferable that the compound and the simple substance have a high purity.

The above-mentioned compound or simple substance is mixed to form a raw material mixture. The above-mentioned compound or simple substance is used in combination of two or more kinds so that the raw material mixture as a whole contains an element containing a solid electrolyte as an essential element, that is, lithium, phosphorus and sulfur, and optionally an element such as halogen.

In one embodiment of the present invention, the raw material mixture contains a lithium compound, a phosphorus compound, and a halogen compound, and at least one of the lithium compound and the phosphorus compound preferably contains a sulfur element, more preferably a combination of $Li_2S$, phosphorus sulfide, and lithium halide, and still more preferably a combination of $Li_2S$, $P_2S_5$, and LiCl and/or LiBr.

For example, when $Li_2S$, $P_2S_5$, LiCl, and LiBr are used as the raw material of the argyrodite-type solid electrolyte, the molar ratio of the input raw material may be set to $Li_2S$: $P_2S_5$:the sum of LiCl and LiBr=30 to 60:10 to 25:15 to 50.

For example, when $Li_2S$, $P_2S_5$ and lithium halide are used as the raw material of the RII-type solid electrolyte, the molar ratio of $Li_2S$ and $P_2S_5$ may be 65:35 to 85:15, preferably 67:33 to 80:20, more preferably 72:28 to 78:22, and most preferably 74:26 to 76:24. Also, the molar ratio of lithium halide to the sum of the molar amounts of $Li_2S$ and $P_2S_5$ is preferably 50:50 to 99:1, more preferably 55:45 to 97:3, still more preferably 60:40 to 96:4, and particularly preferably 70:30 to 96:4.

The argyrodite-type solid electrolyte can be produced by, for example, thoroughly mixing the above-mentioned raw material mixture in a mortar, a ball mill, a vibration mill, a rolling mill, or a kneading machine, and then performing a heat treatment. Since mixing can be processed continuously in a short time, it is preferable to use a kneading machine. The kneading machine is not particularly limited, but a multi-axis kneading machine having two or more axis is preferable. In the present mixing, a raw material mixture may be reacted to form glass.

The heat treatment temperature is preferably 350 to 480° C., more preferably 360 to 460° C., and particularly preferably 380 to 450° C.

The heat treatment time varies depending on the composition and temperature, but may be adjusted within a range of 10 minutes or more and 48 hours or less, for example.

Atmosphere of the heat treatment is not particularly limited, but is preferably not under a hydrogen sulfide airflow but under an inert gas such as nitrogen, argon, or the like.

The RII-type solid electrolyte can be produced by converting the raw material mixture into the sulfide glass by, for example, melt quenching method, mechanical milling (MM) method, slurry method, solid phase method to form sulfide glass, and then heat-treating the sulfide glass. The slurry method is particularly preferable because the sulfide glass can be produced at low cost.

The slurrying method can be referred to, for example, WO2004/093099, WO2009/047977. The sulfide glass is obtained by reacting the raw material mixture in an organic solvent for a predetermined period of time. As described in JP 2010-140893 A, a slurry containing a raw material may be reacted while circulating between a bead mill and a reaction vessel in order to proceed the reaction. Further, as described in the WO2009/047977, when the raw material lithium sulfide is pulverized in advance, the reaction can proceed efficiently.

The organic solvent may be a polar solvent or a non-polar solvent. Examples of the non-polar solvent include hydrocarbon solvent. Examples of the hydrocarbon solvent include an aliphatic hydrocarbon solvent and an aromatic hydrocarbon solvent, and the raw material mixture is preferably mixed in an aromatic hydrocarbon solvent. As the aromatic hydrocarbon solvent, alkylbenzene is preferable. As the alkylbenzene, toluene is preferable.

The producing conditions such as the temperature condition, the processing time, and the charging amount can be appropriately adjusted in accordance with the equipment to be used.

The heat treatment temperature of the sulfide glass is, for example, 160 to 350° C.

The heat treatment time is preferably 0.005 minutes or more and 10 hours or less. More preferably, the heat treatment time is 0.005 minutes or more and 4 hours or less, and particularly preferably 1 minute or more and 3 hours or less.

The temperature raising method is not particularly limited. The temperature may be slowly raised to a predetermined temperature or rapidly heated.

The heat treatment is preferably performed in an environment of (dew point −40)° C. or less, more preferably performed in an environment of (dew point −60)° C. or less. The pressure during the heat treatment may be a normal pressure or a reduced pressure. The atmosphere may be air, or may be an inert atmosphere such as a nitrogen atmosphere.

The sulfide glass may have two separate exothermic peaks in thermogravimetry-differential thermal analysis. In this case, in thermogravimetry-differential thermal analysis at a temperature rising rate of 10° C./min, it is preferable to perform heat treatment at a temperature in the vicinity of the Tc1 or a temperature lower than the Tc1 (for example, Tc1−18° C. or more and Tc1−22° C. or less) when the peak top temperature on the low temperature side is Tc1 and the peak top temperature on the high temperature side is Tc2, among the exothermic peaks observed at a temperature ranging from 150° C. to 350° C.

The sulfide solid electrolyte of the present invention can be obtained by mixing the sulfide solid electrolyte (A) and the sulfide solid electrolyte (B). For mixing, for example, a mortar, a ball mill, a vibration mill, a rolling mill, or a kneading machine can be used.

The sulfide solid electrolyte of the present invention can be used in a solid electrolyte layer, a positive electrode, a negative electrode, etc. of a lithium ion secondary battery, and the like.

[Electrode Mix]

The electrode mix according to one embodiment of the present invention comprises the above-mentioned sulfide solid electrolyte of the present invention and an active material. Alternatively, the electrode mix is produced by the sulfide solid electrolyte of the present invention. When a negative electrode active material is used as the active material, the electrode mix becomes a negative electrode mix. On the other hand, when a positive electrode active material is used, the electrode mix becomes a positive electrode mix.

Negative Electrode Mix

A negative electrode mix is obtained by incorporating a negative electrode active material to the sulfide solid electrolyte of the present invention.

As the negative electrode active material, for example, a carbon material, a metal material, or the like can be used. A complex composed of two or more of these can also be used. Further, a negative electrode active material to be developed in the future can also be used.

It is preferred that the negative electrode active material has electron conductivity.

Examples of the carbon materials include graphite (e.g., artificial graphite), graphite carbon fiber, resin calcined carbon, pyrolytic vapor-grown carbon, coke, mesocarbon microbeads (MCMB), burned carbon of furfuryl alcohol resin, polyacene, pitch-based carbon fibers, vapor grown carbon fibers, natural graphite, non-graphitizable carbon and the like.

Examples of the metallic material include a simple metal substance, alloys, and metal compounds. Examples of the simple metal substance include metallic silicon, metallic tin, metallic lithium, metallic indium, and metallic aluminum. Examples of the alloy include an alloy comprising at least one of silicon, tin, lithium, indium, and aluminum. Examples of the metal compound include a metal oxide. The metal oxide is, for example, silicon oxide, tin oxide or aluminum oxide.

The mixing ratio (mass ratio) of the negative electrode active material and the solid electrolyte is preferably 95:5 to 5:95, more preferably 90:10 to 10:90, and more preferably 85:15 to 15:85.

When the content of the negative electrode active material in the negative electrode mix is too small, the electric capacity becomes small. Further, when the negative electrode active material has electron conductivity and does not contain a conductive aid, or contains only a small amount of a conductive aid, it is considered that the electron conductivity (electron conduction path) in the negative electrode may be lowered to decrease the rate characteristic, or the utilization rate of the negative electrode active material may be lowered to decrease the electric capacity. On the other hand, when the content of the negative electrode active material in the negative electrode mix is too large, it is considered that the ionic conductivity (ion conduction path) in the negative electrode may be lowered to decrease the rate characteristics, or the utilization rate of the negative electrode active material may be lowered to decrease the electric capacity.

The negative electrode mix may further contain a conductive aid.

When the electron conductivity of the negative electrode active material is low, it is preferable to add a conductive aid. The conductive aid may have conductivity, and the electronic conductivity thereof is preferably $1 \times 10^3$ or more S/cm, more preferably $1 \times 10^5$ or more S/cm.

Specific examples of the conductive aid include a substance containing at least one element selected from the group consisting of carbon, nickel, copper, aluminum, indium, silver, cobalt, magnesium, lithium, chromium, gold, ruthenium, platinum, beryllium, iridium, molybdenum, niobium, osmium, rhodium, tungsten, and zinc, and more preferably, a simple carbon or a carbon material other than simple carbon, and a simple metal substance, metal mixture or metal compound containing nickel, copper, silver, cobalt, magnesium, lithium, ruthenium, gold, platinum, niobium, osmium, or rhodium, which have high conductivity.

Specific examples of the carbon material include carbon black such as Ketjenblack, acetylene black, Dencablack, thermal black, channel black, and the like; graphite, carbon fiber, activated carbon, and the like, which can be used alone or in combination with two or more kinds. Among them, acetylene black, Dencablack, and Ketjenblack having high electron conductivity are preferable.

In the case where the negative electrode mix contains the conductive aid, the content of the conductive aid is preferably 1 to 40 mass %, more preferably 2 to 20 mass %. It is considered that when the content of the conductive aid is too small, the electronic conductivity of the negative electrode may be lowered to decrease the rate characteristic, or the utilization rate of the negative electrode active material may be lowered to decrease the electric capacity. On the other hand, when the content of the conductive aid is too large, the amount of the negative electrode active material and/or the amount of the solid electrolyte decreases. It is presumed that when the amount of the negative electrode active material decreases, the electric capacity decreases. In addition, it is considered that when the amount of the solid electrolyte is reduced, the ionic conductivity of the negative electrode may be lowered to decrease the rate characteristics or the utilization rate of the negative electrode mix may be lowered to decrease the electric capacity.

In order to allow the negative electrode active material and the solid electrolyte to be bonded tightly, a binder may be further included.

As the binder, fluorine-comprising resins such as polytetrafluoroethylene (PTFE), polyvinylidene fluoride (PVDF), and fluorine rubber; thermoplastic resins such as polypropylene and polyethylene; ethylene-propylene-diene rubber (EPDM), sulfonated EPDM, natural butyl rubber (NBR), and the like can be used alone or as mixtures of two or more kinds. In addition, an aqueous dispersion of cellulose or styrene butadiene rubber (SBR), which is an aqueous binder, can be used.

The negative electrode mix can be produced by mixing a solid electrolyte and a negative electrode active material, and an arbitrary conductive aid and/or a binder.

Although the mixing method is not particularly limited, for example, a dry mixing using a mortar, a ball mill, a beads mill, a jet mill, a planetary ball mill, a vibrating ball mill, a sand mill, or a cutter mill; and a wet mixing in which the raw material is dispersed into an organic solvent and mixed by using a mortar, a ball mill, a beads mill, a planetary ball mill, a vibrating ball mill, a sand mill, or FILMIX and subsequently the solvent is removed can be applied. Among them, wet mixing is preferable in order not to destroy the negative electrode active material particles.

Positive Electrode Mix

A positive electrode mix is obtained by mixing the positive electrode active material into the sulfide solid electrolyte of the present invention.

The positive electrode active material is a material capable of intercalating and desorbing lithium ions, and a material publicly known as a positive electrode active material in the field of batteries can be used. Further, a positive electrode active material to be developed in the future can also be used.

Examples of the positive electrode active material include metal oxides, sulfides, and the like. Sulfides include metal sulfides and non-metal sulfides.

The metal oxide is, for example, a transition metal oxide. Specific examples of the metal oxide include $V_2O_5$, $V_6O_{13}$, $LiCoO_2$, $LiNiO_2$, $LiMnO_2$, $LiMn_2O_4$, $Li(Ni_aCo_bMn_c)O_2$ (0<a<1, 0<b<1, 0<c<1, a+b+c=1), $LiNi_{1-Y}Co_YO_2$, $LiCo_{1-Y}Mn_YO_2$, $LiNi_{1-Y}Mn_YO_2$ (0≤Y<1), $Li(Ni_aCo_bMn_c)O_4$ (0<a<2, 0<b<2, 0<c<2, a+b+c=2), $LiMn_{2-Z}Ni_ZO_4$, $LiMn_{2-Z}Co_ZO_4$ (0<Z<2), $LiCoPO_4$, $LiFePO_4$, $CuO$, $Li(Ni_aCo_bAl_c)O_2$ (0<a<1, 0<b<1, 0<c<1, a+b+c=1), and the like may be mentioned.

Examples of the metal sulfide include titanium sulfide ($TiS_2$), molybdenum sulfide ($MoS_2$), iron sulfide ($FeS$, $FeS_2$), copper sulfide ($CuS$), nickel sulfide ($Ni_3S_2$) and lithium sulfide ($Li_2S$).

In addition, examples of the metallic oxide include bismuth oxide ($Bi_2O_3$) and bismuth lead oxide ($Bi_2Pb_2O_5$) and the like.

Examples of non-metallic sulfides include organic disulfide compounds and carbon sulfide compounds.

In addition to those mentioned above, niobium selenide ($NbSe_3$), metal indium, and sulfur can also be used as the positive electrode active material.

The positive electrode mix may further comprise a conductive aid.

The conductive aid is the same as that of the negative electrode mix.

The mixing ratio of the solid electrode and the positive electrode active material of the positive electrode mix, the content of the conductive aid and the method for producing the positive electrode mix are the same as those of the above-mentioned negative electrode mix.

[Lithium Ion Battery]

The lithium ion battery according to one embodiment of the present invention comprises at least one of the sulfide solid electrolyte and the electrode mix of the present invention described above. Alternatively, it is produced by at least one of the sulfide solid electrolyte and the electrode mix of the present invention.

The constituent of the lithium ion battery is not particularly limited, but generally has a structure in which a negative electrode layer, an electrolyte layer, and a positive electrode layer are laminated in this order. Hereinafter, each layer of the lithium ion battery will be described.

(1) Negative Electrode Layer

The negative electrode layer is preferably a layer that is produced from the negative electrode mix of the present invention.

Alternatively, the negative electrode layer is a layer that comprises the negative electrode mix of the present invention.

The thickness of the negative electrode layer is preferably 100 nm or more and 5 mm or less, more preferably 1 μm or more and 3 mm or less, and still more preferably 5 μm or more and 1 mm or less.

The negative electrode layer can be produced by a known method, for example, can be produced by a coating method and an electrostatic method (an electrostatic spray method, an electrostatic screen method, etc.).

(2) Electrolyte Layer

The electrolyte layer is a layer containing a solid electrolyte or a layer produced from a solid electrolyte. The solid electrolyte is not particularly limited, but is preferably a sulfide solid electrolyte of the present invention.

The electrolyte layer may consist of a solid electrolyte and may further comprise a binder. As the binder, the same can be used as that for the negative electrode mix of the present invention can be used.

The thickness of the electrolyte layer is preferably 0.001 mm or more and 1 mm or less.

The solid electrolyte of the electrolyte layer may be in fused. Fusion means that a part of the solid electrolyte particles is melted and the melted part integrates with other solid electrolyte particles. Further, the electrolyte layer may be a plate-like body of the solid electrolyte, and as for the plate-like body, there may be cases where part or all of the solid electrolyte particles are melted to form a plate-like body.

The electrolyte layer can be produced by a publicly-known method, for example, a coating method or an electrostatic method (an electrostatic spray method, an electrostatic screen method, etc.).

(3) Positive Electrode Layer

The positive electrode layer is a layer that comprises a positive electrode active material. Preferably, the positive electrode layer is a layer that comprises the positive electrode mix of the present invention or a layer produced from the positive electrode mix of the present invention.

The thickness of the positive electrode layer is preferably 0.01 mm or more and 10 mm or less.

The positive electrode layer can be produced by a publicly-known method, for example, a coating method, an electrostatic method (an electrostatic spray method, an electrostatic screen method, etc.).

(4) Current Collector

The lithium ion battery of one embodiment of the present invention preferably further comprises a current collector. For example, the negative electrode current collector is provided on the side opposite to the electrolyte layer side of the negative electrode layer, and the positive electrode current collector is provided on the side opposite to the electrolyte layer side of the positive electrode layer.

As the current collector, a plate-like body or a foil-like body, and the like formed of copper, magnesium, stainless steel, titanium, iron, cobalt, nickel, zinc, aluminum, germanium, indium, lithium or an alloy thereof, or the like.

The lithium ion battery of one embodiment of the present invention can be produced by attaching and jointing the above-described members. As a method of jointing, there are a method of laminating each member, pressing and crimping the members, a method of pressing through between two rolls (roll to roll), and the like.

Jointing may be conducted with an active material having an ionic conductivity or an adhesive material that does not impair ionic conductivity on the jointing surface.

In the jointing, heat fusing may be used within a range that the crystal structure of the solid electrolyte is not changed.

The lithium ion battery of one embodiment of the present invention can also be produced by sequentially forming the above-described members. It can be produced by a publicly-known method, for example, a coating method, an electrostatic method (an electrostatic spray method, an electrostatic screen method, etc.).

EXAMPLES

The present invention is described below in more detail by Examples.

The evaluation method is as follows.

(1) Volume-Based Mean Particle Size ($D_{50}$)

A measurement was performed with a laser diffraction/scattering type particle diameter distribution measurement device (manufactured by HORIBA, LA-950V2 model LA-950W2). A mixture of dehydrated toluene (Wako Pure Chemical Industries, Ltd., Special Grade) and tertiary butyl alcohol (Wako Pure Chemical Industries, Ltd., Special Grade) in a weight ratio of 93.8:6.2 was used as a dispersion medium. 50 mL of the disperse medium was poured into a flow cell of the device, and circulated. Thereafter, an object to be measured was added to the disperse medium, a resulting product was ultrasonically treated, and then particle diameter distribution was measured. The addition amount of the measurement object was adjusted so that the red-light transmittance (R) corresponding to the particle concentration was 80 to 90% and the blue-light transmittance (B) corresponding to the particle concentration was 70 to 90% on the measurement screen defined by the device. The calculation conditions used were 2.16 as the value of the refractive index of the measurement object and 1.49 as the value of the refractive index of the dispersion medium, respectively. In the setting of the distribution form, the particle size calculation was performed by fixing the number of repetitions to 15 times.

(2) Ionic Conductivity Measurement

The sulfide solid electrolyte produced in each Example was filled in a tablet molding machine, and a pressure of 22 MPa was applied to form a molded body. Carbon was placed on both sides of the molded body as an electrode, and pressure was applied again by a tablet molding machine, whereby a molded body for measurement (diameter: about 10 mm, thickness: 0.1 to 0.2 cm) was produced. The ionic conductivity of this molded body was measured by AC Impedance measurement. The conductivity values at 25° C. were adopted.

(3) X-Ray Diffraction (XRD) Measurement

A circular pellet having a diameter of 10 mm and a height of 0.1 to 0.3 cm was molded from the powder of the sulfide solid electrolyte produced in each Example to obtain a sample. The sample was measured without exposure to air using an XRD airtight holder. The 2θ position of the diffraction peak was determined by the centroid method using an XRD analysis program JADE.

Measurement was conducted under the following conditions by using a powder X-ray diffractometer SmartLab manufactured by Rigaku Corporation.

Tube voltage: 45 kV

Tube current: 200 mA

X-ray wavelength: Cu-Kα radiation (1.5418 Å)

Optical system: Parallel beam system

Slit configuration: solar slit 5°, incident slit: 1 mm, light receiving slit: 1 mm Detector Scintillation counter Measurement range: 2θ=10 to 60 deg Step width, scan speed: 0.02 deg, 1 deg/min In the analysis of the peak position for confirming the existence of the crystal structure from the measurement result, the peak position was obtained by drawing the baseline by cubic approximation using the XRD analysis program JADE.

(4) Compaction Property

Compaction property was evaluated by using a uniaxial compression device.

Figure 1:
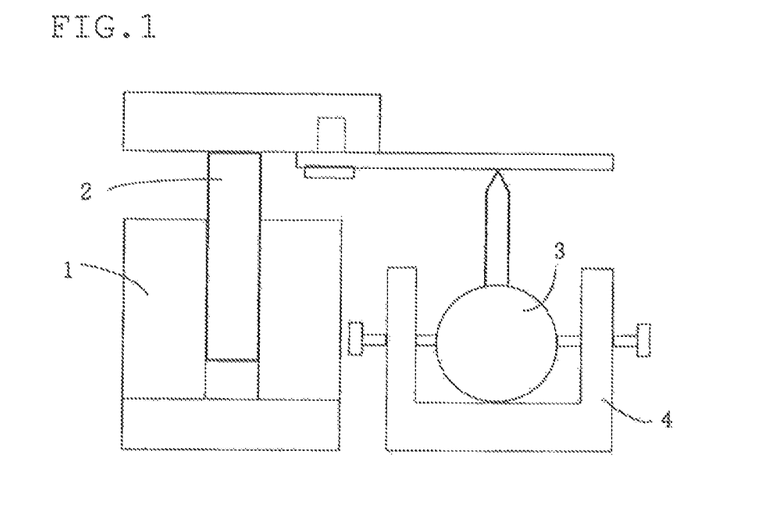
FIG. 1 is a schematic diagram for explaining the evaluation of the compaction property using the uniaxial compression device.
Figure 2:
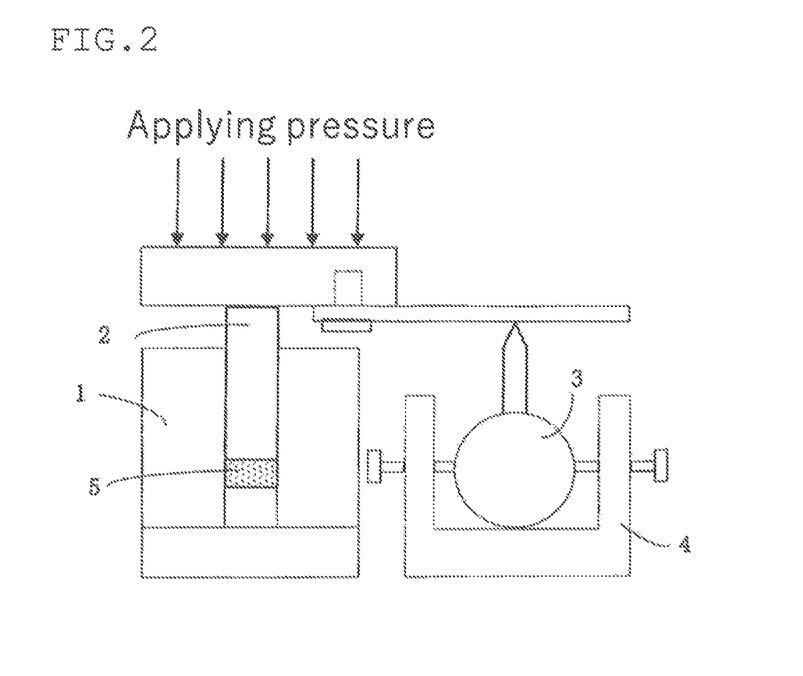
FIG. 2 is a schematic diagram for explaining the evaluation of the compaction property using the uniaxial compression device.
Figure 3:
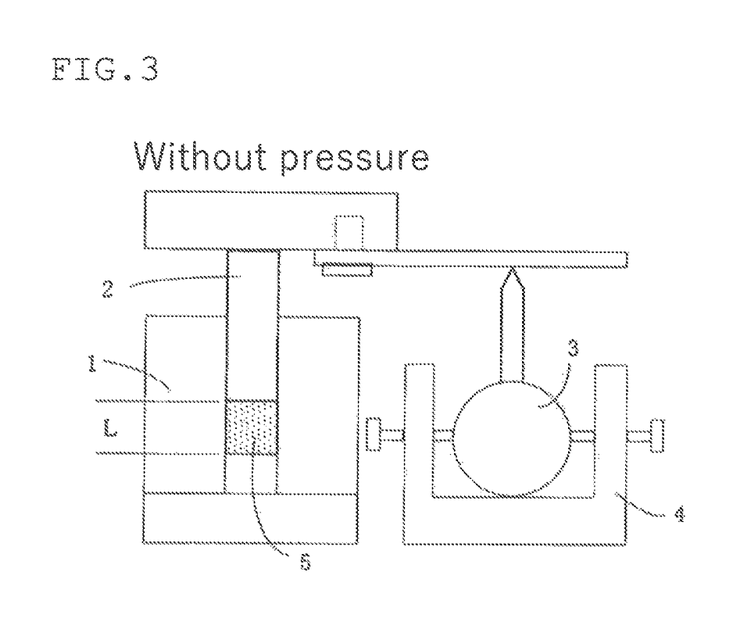
FIG. 3 is a schematic diagram for explaining the evaluation of the compaction property using the uniaxial compression device.

FIGS. 1 to 3 are schematic diagrams for explaining the evaluation of the compaction property using the uniaxial compression apparatus.

The main components of the uniaxial compression apparatus are a pressure-resistant cylindrical container 1, a pressure rod 2 for pressurizing the composite introduced into the internal space of the cylindrical container 1 to increase the density of the composite to a true density, and a measurement means (a micrometer) 3 and a fixing device 4 thereof for measuring the height of the composite 5.

As the cylindrical container 1, a cylindrical container having an outer diameter of 43 mm, an inner diameter of 13 mm, a height of 40 mm, a side thickness of 15 mm, a bottom surface having an outer diameter of 13 mm and a thickness of 10 mm, and made of SKD11 is used. The SKD11 is die steel manufactured by Daido Steel Co., Ltd.

The pressure rod 2 is smoothly inserted into the cylindrical container 1, and has an outer diameter of 13 mm and a length of 50 mm, and is made of SKD11. Above the pressure rod 2, there is a pressing means (not shown in the figure) for pressurizing. In addition, a transmission unit is provided for transmitting the displacement of the pressure rod to the micrometer.

The space factor when the sample was compressed at 540 MPa (compression space factor: $\varepsilon_{540}$) and the space factor when the pressure was released (post pressure-release space factor $\varepsilon_0$) were measured by a uniaxial compression device, and the elastic recovery factor $\varepsilon_r$ was calculated. Specific examples are as follows.

First, the micrometer values without inserting a sample ($I_0$) are checked (FIG. 1).

Next, 0.3 g of the sample 5, which may be 0.1 g or 0.05 g in the case of a large bulk density, is put into the cylindrical container 1, and the sample is made to be in a state of leveling.

The pressure rod 2 is inserted into the container 1, and the value when the sample 5 is compressed by pressurizing at 540 MPa ($I_1$) of the micrometer is checked (FIG. 2).

Next, pressurization by the pressurizing rod 2 is stopped, and the values with the pressure released from the sample 5 ($I_3$) of the micrometer are checked (FIG. 3).

From the height of the sample at the time of compression and release, the space factor ε (%) can be calculated from the following formula (A).

$$\varepsilon=[1-\rho_a/\rho_p]\times 100=[1-\{m/(\rho_p SL)\}]\times 100 \quad (A)$$

wherein in the formula, pa is the apparent density of the material, $\rho_p$ is the true density of the material, m is the weight of the material to be inserted into the cylindrical container, S is the area of the pressure rod, L is ($I_0-I_1$) for the compression space factor ($\varepsilon_{540}$), and L is ($I_0-I_3$) for the post pressure-release space factor ($\varepsilon_0$).

Note that the true density $\rho_p$ of the sample is obtained by the following formula (C).

{(true density of sulfide solid electrolyte (A))×
(weight percent of sulfide solid electrolyte (A)
in the sample)+(true density of sulfide solid
electrolyte (B))×(weight percent of sulfide solid
electrolyte (B) in the sample)}/100     (C)

The elastic recovery factor $\varepsilon_r$ (%) was calculated from the following formula (B).

$$\varepsilon_r=\varepsilon_{540}-\varepsilon_0 \quad (B)$$

wherein in the formula, $\varepsilon_r$ is the elastic recovery rate, $\varepsilon_{540}$ is the space factor when the sample is compressed at 540 MPa (compression space factor), and $\varepsilon_0$ is the space factor when pressure is released (post pressure-release space factor).

Production Example 1

[Production of Lithium Sulfide ($Li_2S$)]

In a 500 mL-separable flask equipped with a stirrer, 200 g of LiOH anhydride (manufactured by Honjo Chemical Corporation) dried under an inert gas was prepared. The temperature was raised under a stream of nitrogen, and the internal temperature was maintained at 200° C. Nitrogen gas was switched to hydrogen sulfide gas (Sumitomo Seika Chemicals Company, Limited) at a flow rate of 500 mL/min, and LiOH anhydride and hydrogen sulfide were reacted.

Moisture generated by the reaction was condensed by a condenser and recovered. The reaction was carried out for 6 hours at which time 144 mL of water was recovered. The reaction was continued for an additional 3 hours, but no moisture generation was observed.

The product powder was collected and measured for purity and XRD. As a result, the purity was 98.5%, and the peak pattern of $Li_2S$ was confirmed by XRD. The content of LiOH was 0.1 mass % or less.

Production Example 2

[Production of a Sulfide Solid Electrolyte (Sulfide Solid Electrolyte (A1)) Having an Argyrodite-Type Crystal Structure]

$Li_2S$, $P_2S_5$ (manufactured by Thermophos), LiCl (manufactured by Sigma Aldrich Co. LLC., purity: 99%), and LiBr (manufactured by Sigma Aldrich Co. LLC., purity: 99%) produced in Production 1 were used as starting materials. 2.98 g of $Li_2S$, 3.79 g of $P_2S_5$, 1.45 g of LiCl, and 1.78 g of LiBr were blended to prepare a raw material mixture.

The raw material mixture and 600 g of zirconia balls having a diameter of 10 mm were put in a planetary ball mill (manufactured by Fritchu Corporation: Model No. P-5) zirconia pot (500 mL) and completely sealed. The inside of the pot was an argon atmosphere. A glassy powder (intermediate) was obtained by treatment (mechanical milling) with a planetary ball mill at a rotational speed of 220 rpm for 72 hours.

Approximately 2 g powder of the above-mentioned intermediate was packed into a Tamman tube (PT2, manufactured by Tokyo Glass Equipment Co., Ltd.) in a glove box in an argon atmosphere, and the opening of the Tamman tube was closed with quartz wool, and sealed with a sealed container made of SUS so that the air could not enter. The sealed container was then placed in an electric furnace (FUW243PA, manufactured by Advantech Toyo Kaisha, Ltd.) and heat treated. Specifically, the temperature was raised from room temperature to 430° C. at 2.5° C./min (raised to 430° C. in 3 hours), and held at 430° C. for 8 hours. After that, it was gradually cooled, collected in a glove box under an argon atmosphere, and pulverized in a mortar to obtain a sulfide solid electrolyte (A1).

The ionic conductivity and compaction property of sulfide solid electrolyte (A1) were evaluated. The results are shown in Table 1 (Comparative Example 1).

Figure 4:
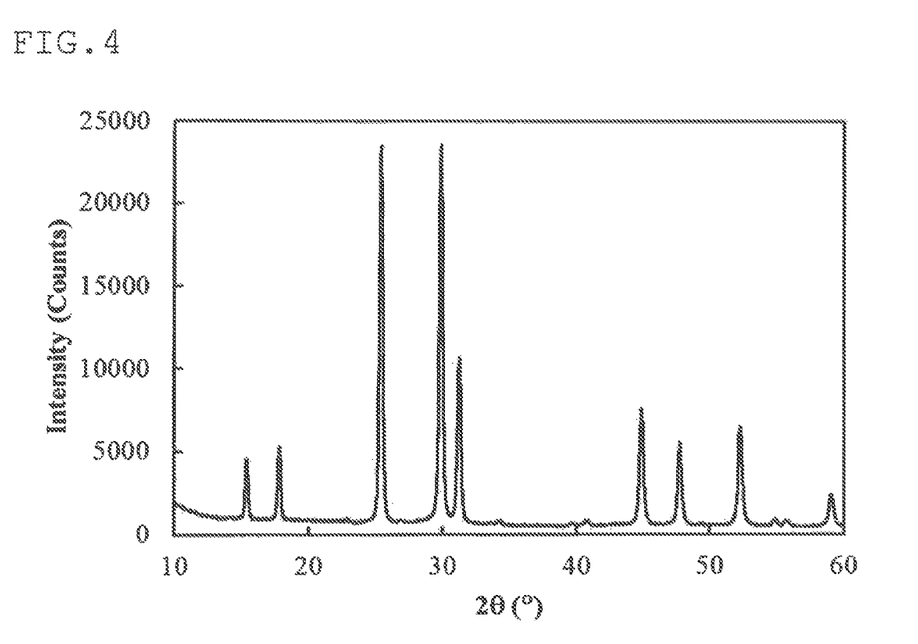
FIG. 4 is an X-ray diffraction pattern of the sulfide solid electrolyte (A1) produced in Production Example 2.

The XRD pattern of the sulfide solid electrolyte (A1) is shown in FIG. 4. In the XRD pattern, peaks derived from the argyrodite-type crystal structure were observed at 2θ=25.4 deg, 29.9 deg, and the like.

The true density of the sulfide solid electrolyte (A1) was 2.0 g/cm³. The volume-based mean particle diameter ($D_{50}$) was 50 μm.

Production Example 3

[Production of Sulfide Solid Electrolyte Having a Crystal Structure Similar to Thio-LISICON Region II-Type Crystal Structure (Sulfide Solid Electrolyte (B))]

1.5 L glass-made reactor equipped with a stirrer was connected to a bead mill (444 g zirconia balls made by Ashizawa Fine-Tech Co., Ltd., 0.15 L, 0.5 mm in diameter were introduced) and the raw material mixture (slurry) was allowed to circulate between them.

A raw material mixture slurry in which 1200 mL of dehydrated toluene and 5.4 mL of isobutyronitrile were added to 29.3 g of $Li_2S$, 47.2 g of $P_2S_5$ and 13.1 g of LiBr was introduced into the producing apparatus.

The raw material mixture slurry filled in the producing apparatus was circulated between the reactor and the bead mill at a flow rate of 550 mL/min by a pump. The main body of the bead mill was operated at a peripheral speed of 12 m/s by passing warm water through an external circulation so that the liquid temperature could be maintained at 60° C. Slurries were collected every 2 hours, and powder X-ray diffractometry was performed by using an XRD apparatus (SmartLab apparatus, manufactured by Rigaku Corporation) to confirm the remaining amount of the raw material. From the results of the XRD analysis, it was confirmed that the XRD peak of the raw material disappeared and the sulfide glass was obtained, and after 30 hours, the operation was terminated.

The obtained slurry was placed in a Schlenk bottle, dried under vacuum at 60° C., and then heat-treated under vacuum at 205° C. for 2 hours, thereby obtaining a sulfide solid electrolyte (B).

Figure 5:
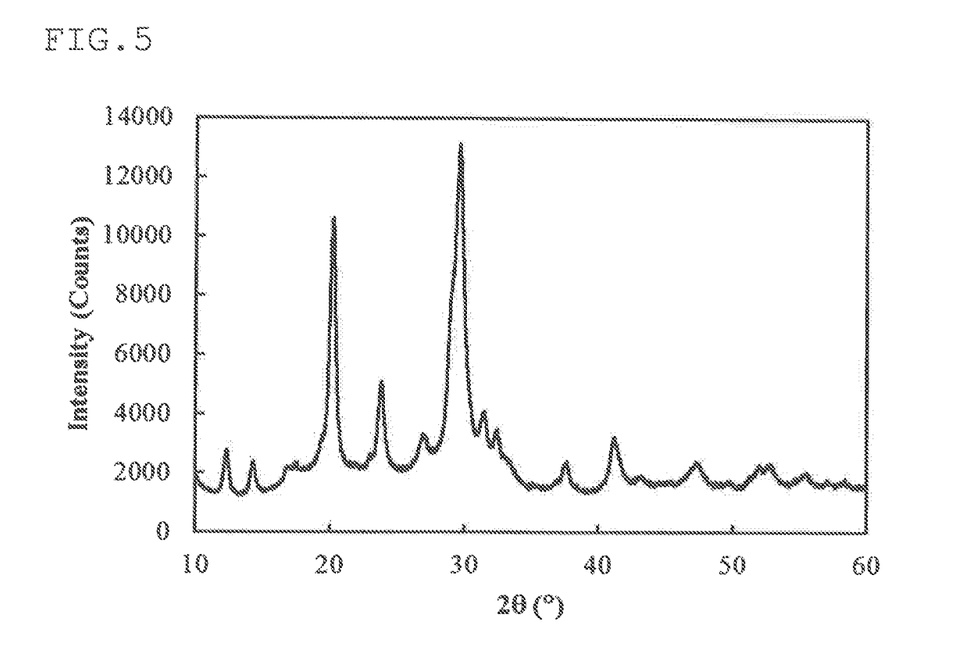
FIG. 5 is an X-ray diffraction pattern of the sulfide solid electrolyte (B) produced in Production Example 3.

The XRD pattern of the sulfide solid electrolyte (B) is shown in FIG. 5. In the XRD pattern, peaks derived from the crystal structure similar to the thio-LISICON Region II-type crystal structure were observed at 2θ=20.2 deg, 23.8 deg, 29.6 deg, etc.

The true density of the sulfide solid electrolyte (B) was 2.1 g/cm$^3$. $D_{50}$ was 3 μm.

Production Example 4

[Production of a Sulfide Solid Electrolyte Having an Argyrodite-Type Crystal Structure (Sulfide Solid Electrolyte (A2))]
(A) Milling Process Li$_2$S obtained in Production Example 1 was pulverized in a nitrogen atmosphere by using a pin mill (100UPZ manufactured by Hosokawa Micron Corporation) having a fixed quantity feeding machine. The input speed was 80 g/min, and the rotation speed of the disc was 18000 rpm.

Similarly, P$_2$S$_5$ (manufactured by Thermophos), LiBr (manufactured by Honjo Chemical Corporation) and LiCl (manufactured by Sigma Aldrich Co. LLC.) were each pulverized by a pin mill. The input speed of the P$_2$S$_5$ was 140 g/min, and the rotational speed of the disc was 18000 rpm. The input velocity of LiBr was 230 g/min, and the rotation velocity of the disk was 18000 rpm. The input speed of the LiCl was 250 g/min, and the rotational speed of the disc was 18000 rpm.
(B) Mixing Process In a nitrogen-atmosphere glove box, the respective compounds obtained in above (A) were prepared so that the molar ratios were Li$_2$S:P$_2$S$_5$:LiBr:LiCl=1.9:0.5:0.6:1.0, and the total amount was 400 g, and introduced into the glass containers, and mixed crudely by shaking the glass containers.

400 g of the crude mixture was put into a two-axis kneader (KRC-S1, manufactured by Kurimoto, Ltd.) at a speed of 10 g/min, and the screw was operated at a rotational speed of 220 rpm. The cumulative power at this time was 0.10 kWh/kg. $D_{50}$ of the resulting raw material mixture was 3.4 μm.
(C) Heat-Treating Process 40 g of the raw material mixture obtained in above (B) was placed in an alumina caster, and heat-treated in an electric furnace at 460° C. for 2 hours to obtain a sulfide solid electrolyte. AN operations were carried out under a nitrogen atmosphere.

The ionic conductivity (σ) of the obtained sulfide solid electrolyte was 9.6 mS/cm, and $D_{50}$ of the sulfide solid electrolyte was 36 μm.

As a result of the XRD measurement of the sulfide solid electrolyte, peaks derived from the argyrodite-type crystal structure were observed.
(D) Particulating Step 30 g of the sulfide solid electrolyte obtained above was dispersed in 660 mL of solvent (dehydrated toluene, Wako Pure Chemical Industries, Ltd.) in a glove box under a nitrogen atmosphere to form a slurry of about 5.0 weight %. The sulfide solid electrolyte was particulated by pulverizing using a bead mill (LMZ015, manufactured by Ashizawa Finetech, Ltd.) while maintaining the slurry in a nitrogen atmosphere. Specifically, 456 g of 0.5 mmφ zirconia beads were used as the pulverizing medium, and the bead mill was operated at a peripheral speed 8 m/s and a flow rate of 500 mL/min, and slurries were introduced into the apparatus and passed through 10 times. The treated slurry was placed in a nitrogen substituted Schlenk bottle and dried under reduced pressure to obtain sulfide solid electrolyte (A2).

Ionic conductivity and compaction property of the sulfide solid electrolyte (A2) were evaluated. The results are shown in Table 2 (Comparative Example 3).

As a result of the XRD measurement of the sulfide solid electrolyte (A2), peaks derived from the argyrodite-type crystal structure were observed.

The true density of the sulfide solid electrolyte (A2) was 2.1 g/cm$^3$. $D_{50}$ was 2 μm.

Example 1

A sulfide solid electrolyte was produced by mixing 0.8 g of the sulfide solid electrolyte (A1) obtained in Production Example 2 and 0.2 g of the sulfide solid electrolyte (B) obtained in Production Example 3 in a mortar for 10 minutes.

The ionic conductivity and compaction properties of the obtained sulfide solid electrolyte were evaluated. Results are shown in Table 1.

TABLE 1

|  | Example 1 | Example 2 | Comparative Example 1 | Comparative Example 2 |
|---|---|---|---|---|
| Ionic conductivity (mS/cm) | 4.1 | 3.6 | 10.5 | 2.4 |
| Compression space factor $\varepsilon_{540}$ (%) | 9.0 | 7.4 | 10.9 | 8.9 |
| Post pressure-release space factor $\varepsilon_0$ (%) | 9.4 | 7.8 | 14.4 | 9.6 |
| Elastic recovery (%) | 0 4 | 0.4 | 5.5 | 0.7 |

Example 2

A sulfide solid electrolyte was produced by mixing 0.6 g of the sulfide solid electrolyte (A1) obtained in Production Example 2 and 0.4 g of the sulfide solid electrolyte (B) obtained in Production Example 3 in a mortar for 10 minutes, and evaluated in the same manner as in Example 1. Results are shown in Table 1.

Comparative Example 1

The sulfide solid electrolyte (A1) obtained in Production Example 2 was evaluated for ionic conductivity and compaction property. Results are shown in Table 1.

Comparative Example 2

The sulfide solid electrolyte (B) obtained in Production Example 3 was evaluated for ionic conductivity and compaction property. Results are shown in Table 1.

Example 3

A sulfide solid electrolyte was produced by mixing 0.8 g of the sulfide solid electrolyte (A2) obtained in Production Example 4 and 0.2 g of the sulfide solid electrolyte (B) obtained in Production Example 3 in a mortar for 10 minutes, and evaluated in the same manner as in Example 1. Results are shown in Table 2.

TABLE 2

|  | Example 3 | Example 4 | Comparative Example 3 | Comparative Example 2 |
|---|---|---|---|---|
| Ionic conductivity (mS/cm) | 2.8 | 2.7 | 4.1 | 2.4 |
| Compression space factor $\varepsilon_{540}$ (%) | 9.5 | 8.4 | 10.8 | 8.9 |
| Post pressure-release space factor $\varepsilon_0$ (%) | 10.2 | 9.0 | 15.0 | 9.6 |
| Elastic recovery (%) | 0.7 | 0.6 | 4.2 | 0.7 |

Example 4

A sulfide solid electrolyte was produced by mixing 0.6 g of the sulfide solid electrolyte (A2) obtained in Production Example 4 and 0.4 g of the sulfide solid electrolyte (B) obtained in Production Example 3 in a mortar for 10 minutes, and evaluated in the same manner as in Example 1. Results are shown in Table 2.

Comparative Example 3

The sulfide solid electrolyte (A2) obtained in Production Example 4 was evaluated for ionic conductivity and compaction property. Results are shown in Table 2. For reference, the results of Comparative Example 2 are shown in Table 2.

Evaluation Example

The sulfide solid electrolyte obtained in Examples 2 to 4, Comparative Example 1 (sulfide solid electrolyte (A1)), Comparative Example 2 (sulfide solid electrolyte (B)), and Comparative Example 3 (sulfide solid electrolyte (A2)) were used to produce lithium ion batteries and evaluate cycle characteristics.

(A) Production of Lithium Ion Battery 50 mg of the sulfide solid electrolyte of the examples was put into a stainless-steel mold having a diameter of 10 mm, flattened, and the layer thickness of the electrolyte layer was made uniform, and then pressure molding was performed by applying a pressure of 185 MPa from the top surface of the electrolyte layer with a hydraulic press (P-6, manufactured by RIKEN KIKI CO., LTD.).

$Li_4Ti_5O_{12}$ coated $LiNi_{0.8}Co_{0.15}Al_{0.05}O_2$ as the positive electrode active material and the sulfide solid electrolyte of the examples as the solid electrolyte were mixed at a ratio of 70:30 by weight to form a positive electrode material, 15 mg of the positive electrode material was put on the upper surface of the electrolyte layer and flattened, so that the layer thickness of the positive electrode layer became uniform, and then pressure molding was performed by applying a pressure of 407 MPa from the top surface of the positive electrode layer with a hydraulic press (P-6, manufactured by RIKEN KIKI CO. LTD.).

The graphite powder as the negative electrode active material and the sulfide solid electrolyte of each example were mixed at a ratio of 60:40 by weight to form a negative electrode material. 12 mg of the negative electrode material was put into the surface of the electrolyte layer facing away from the positive electrode layer to make the thickness of the negative electrode material uniform, and a pressure of 555 MPa was applied from the upper surface of the negative electrode layer by a hydraulic press (P-6, manufactured by RIKEN KIKI CO., LTD.) to perform pressure molding, thereby producing a lithium ion battery having a three-layered structure of a positive electrode, a solid electrolyte layer, and a negative electrode.

(B) Cycle Characteristic Test

The lithium ion battery produced in above (A) was left to stand in a thermostat set at 25° C. for 12 hours and then evaluated.

At 1st cycle, charging was conducted to 4.2 V at 0.1 C (0.189 mA) and discharging was conducted to 3.1 V at 0.1 C (0.189 mA); at 2nd to 10th cycle, charging was conducted to 4.2 V at 0.5 C (0.945 mA) and discharging was conducted to 3.1 V at 0.5 C (0.945 mA); at 11th cycle, charging was conducted to 4.2 V at 0.1 C (0.189 mA) and discharging was conducted to 3.1 V at 0.1 C (0.189 mA); at 12th to 16th cycle, charging was conducted to 4.2 V at 0.2 C (0.378 mA) and discharging was conducted to 3.1 V at 0.2 C (0.378 mA), 0.5 C (0.945 mA), 1 C (1.89 mA), 2 C (3.78 mA), 5 C (9.45 mA) for respective cycles; at 17th to 19th cycle, charging was conducted to 4.2 V at 0.5 C (0.945 mA) and discharging was conducted to 3.1 V at 0.5 C (0.945 mA); and at 20th cycle, charging was conducted to 4.2 V at 0.1 C (0.189 mA) and discharging was conducted to 3.1 V at 0.1 C (0.189 mA).

At the following 19 cycles (21st to 39th cycle), charging was conducted to 4.2 V at 0.5 C (0.945 mA) and discharging was conducted to 3.1 V at 0.5 C (0.945 mA), and at subsequent 1 cycle (40th cycle), charging was conducted to 4.2 V at 0.1 C (0.189 mA) and discharging was conducted to 3.1 V at 0.1 C (0.189 mA); which is a set of 20 cycles. The set was repeated four times for a total of 100 cycles. The capacity retention rate was the ratio of the discharge capacity at the 100th cycle to the maximum discharge capacity during the cycle.

The discharge capacity, the maximum discharge capacity, and the capacity retention rate in the 1st cycle, 11th cycle, 16th cycle, and 100th cycle of the lithium ion battery using the sulfide solid electrolyte of each Example are shown in Tables 3 and 4.

TABLE 3

| Discharge capacity (mAh/g) | Example 2 | Comparative Example 1 | Comparative Example 2 |
|---|---|---|---|
| 1st cycle (at 0.1 C.) | 147 | 137 | 148 |
| 11th cycle (at 0.1 C.) | 147 | 136 | 148 |
| 16th cycle (at 5.0 C.) | 92 | 71 | 64 |
| 100th cycle (at 0.1 C.) | 143 | 129 | 142 |
| Maximum discharge capacity | 147 | 137 | 148 |
| Capacity retention rate (%) | 97 | 94 | 96 |

TABLE 4

| Discharge capacity (mAh/g) | Example 3 | Example 4 | Comparative Example 3 |
|---|---|---|---|
| 1st cycle (at 0.1 C.) | 139 | 145 | 135 |
| 11th cycle (at 0.1 C.) | 139 | 145 | 135 |
| 16th cycle (at 5.0 C.) | 75 | 93 | 70 |
| 100th cycle (at 0.1 C.) | 134 | 141 | 128 |
| Maximum discharge capacity | 139 | 145 | 135 |
| Capacity retention rate (%) | 96 | 97 | 95 |

From Tables 3 and 4, it can be confirmed that the capacity retention rate was improved in the lithium ion battery using the sulfide solid electrolyte of Examples. In addition, since the discharge capacity at 5.0 C is large, it can be confirmed that the sulfide solid electrolyte of Examples is superior to the sulfide solid electrolyte of Comparative Examples in charge/discharge at high speed.

Figure 6:
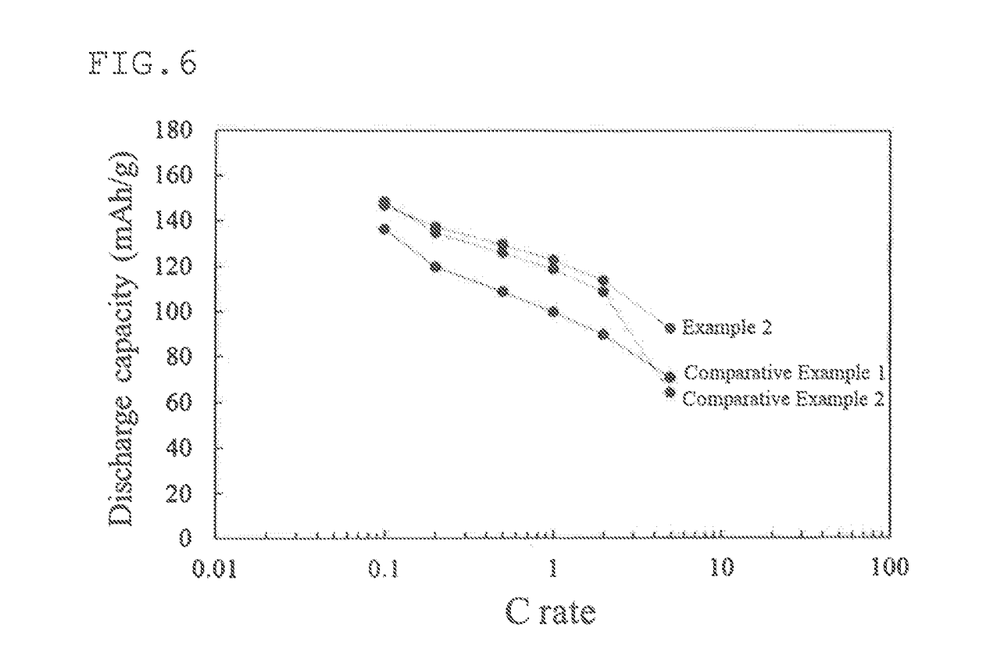
FIG. 6 is a graph showing the relationship between C rate and discharge capacity in Example 2 and Comparative Examples 1 and 2.
Figure 7:
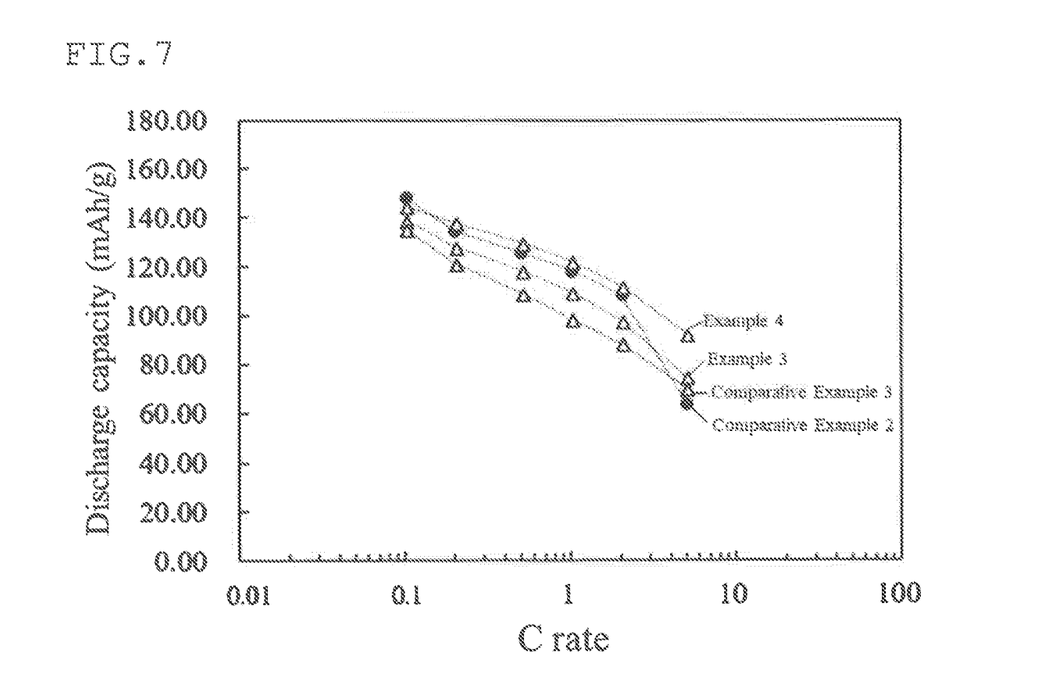
FIG. 7 is a graph showing the relationship between C rate and discharge capacity of Examples 3 and 4 and Comparative Examples 2 and 3.

FIGS. 6 and 7 are graphs showing the relationship between the C rate (charge/discharge rate) and the discharge capacity. It can also be confirmed from FIGS. 6 and 7 that, in the lithium ion battery using the sulfide solid electrolyte of the present invention, the decrease in discharge capacity is small even if the C rate is increased.

The discharge capacity measured in FIGS. 6 and 7 is a value of the 11th cycle to the 16th cycle of the cycle characteristic test.

While embodiments and/or examples of the invention have been described in some detail above, those skilled in the art will readily make many changes to these illustrative embodiments and/or examples without materially departing from the novel teachings and advantages of the invention. Accordingly, many of these modifications are within the scope of the present invention.

The documents described in the specification and the specification of Japanese application(s) on the basis of which the present application claims Pads convention priority are incorporated herein by reference in its entirety.

The invention claimed is:

1. A sulfide solid electrolyte, comprising:
    (A) a sulfide solid electrolyte having an argyrodite-type crystal structure, and
    (B) a sulfide solid electrolyte having a crystal structure different from the argyrodite type crystal structure of the sulfide solid electrolyte (A),
    wherein (B) has exothermic peaks in the range of 150 to 350° C. in thermogravimetry-differential thermal analysis.

2. The sulfide solid electrolyte of claim 1, wherein the sulfide solid electrolyte (A) comprises lithium, sulfur, phosphorus, and at least one halogen as constituent elements.

3. The sulfide solid electrolyte of claim 2, wherein the at least one halogen is Cl or Br.

4. The sulfide solid electrolyte of claim 2, wherein the at least one halogen is Cl and Br.

5. The sulfide solid electrolyte of claim 1, wherein the sulfide solid electrolyte (B) has a thio-LISICON Region II-type crystal structure or a crystal structure similar to the thio-LISICON Region II-type crystal structure.

6. The sulfide solid electrolyte of claim 5, wherein the sulfide solid electrolyte (B) comprises lithium, sulfur, phosphorus, and at least one halogen as constituent elements.

7. The sulfide solid electrolyte of claim 6, wherein the at least one halogen comprises Br.

8. The sulfide solid electrolyte of claim 1, wherein a mass ratio of (A) and (B) [(A):(B)] is 5:95 to 95:5.

9. An electrode mix, comprising the sulfide solid electrolyte of claim 1 and an active material.

10. A lithium ion battery, comprising at least one sulfide solid electrolyte of claim 1 and an electrode mix comprising an active material and at least one of the at least one sulfide solid electrolyte.

11. The sulfide solid electrolyte according to claim 1, wherein
    the sulfide solid electrolyte (A) comprises lithium, sulfur, phosphorus, and at least one halogen as constituent elements, and
    the sulfide solid electrolyte (B) has a thio-LISICON Region II-type crystal structure or a crystal structure similar to the thio-LISICON Region II-type crystal structure.

12. The sulfide solid electrolyte according to claim 1, wherein
    the sulfide solid electrolyte (A) comprises lithium, sulfur, phosphorus, and at least one halogen as constituent elements,
    the sulfide solid electrolyte (B) comprises lithium, sulfur, phosphorus, and at least one halogen as constituent elements, and
    the at least one halogen of (B) comprises Br.

13. The sulfide solid electrolyte according to claim 1, wherein
    the sulfide solid electrolyte (A) comprises lithium, sulfur, phosphorus, and at least one halogen as constituent elements,
    the sulfide solid electrolyte (B) comprises lithium, sulfur, phosphorus, and at least one halogen as constituent elements,
    the at least one halogen of (B) comprises Br, and
    a mass ratio of (A) and (B) [(A):(B)] is 5:95 to 95:5.

14. The sulfide solid electrolyte according to claim 1, wherein
    the sulfide solid electrolyte (A) comprises lithium, sulfur, phosphorus, and at least one halogen as constituent elements,
    the at least one halogen of (A) is Cl or Br, and
    the sulfide solid electrolyte (B) has a thio-LISICON Region II-type crystal structure or a crystal structure similar to the thio-LISICON Region II-type crystal structure.

15. The sulfide solid electrolyte according to claim 1, wherein
    the sulfide solid electrolyte (A) comprises lithium, sulfur, phosphorus, and at least one halogen as constituent elements,
    the at least one halogen of (A) is Cl or Br,
    the sulfide solid electrolyte (B) comprises lithium, sulfur, phosphorus, and at least one halogen as constituent elements, and
    the at least one halogen of (B) comprises Br.

16. The sulfide solid electrolyte according to claim 1, wherein
    the sulfide solid electrolyte (A) comprises lithium, sulfur, phosphorus, and at least one halogen as constituent elements,
    the at least one halogen of (A) is Cl or Br,
    the sulfide solid electrolyte (B) comprises lithium, sulfur, phosphorus, and at least one halogen as constituent elements,
    the at least one halogen of (B) comprises Br, and
    a mass ratio of (A) and (B) [(A):(B)] is 5:95 to 95:5.

17. The sulfide solid electrolyte according to claim 1, wherein
the sulfide solid electrolyte (A) comprises lithium, sulfur, phosphorus, and at least one halogen as constituent elements,
the at least one halogen of (A) is Cl and Br, and
the sulfide solid electrolyte (B) has a thio-LISICON Region II-type crystal structure or a crystal structure similar to the thio-LISICON Region II-type crystal structure.

18. The sulfide solid electrolyte according to claim 1, wherein
the sulfide solid electrolyte (A) comprises lithium, sulfur, phosphorus, and at least one halogen as constituent elements,
the at least one halogen of (A) is Cl and Br,
the sulfide solid electrolyte (B) comprises lithium, sulfur, phosphorus, and at least one halogen as constituent elements, and
the at least one halogen of (B) comprises Br.

19. The sulfide solid electrolyte according to claim 1, wherein
the sulfide solid electrolyte (A) comprises lithium, sulfur, phosphorus, and at least one halogen as constituent elements,
the at least one halogen of (A) is Cl and Br,
the sulfide solid electrolyte (B) comprises lithium, sulfur, phosphorus, and at least one halogen as constituent elements,
the at least one halogen of (B) comprises Br, and
a mass ratio of (A) and (B) [(A):(B)] is 5:95 to 95:5.

20. The sulfide solid electrolyte according to claim 1, wherein
the sulfide solid electrolyte (B) has a thio-LISICON Region II-type crystal structure or a crystal structure similar to the thio-LISICON Region II-type crystal structure, and
a mass ratio of (A) and (B) [(A):(B)] is 5:95 to 95:5.

21. The sulfide solid electrolyte of claim 1, wherein the (A) and (B) are different particles.

* * * * *